United States Patent
Yuan

(10) Patent No.: US 7,563,829 B2
(45) Date of Patent: Jul. 21, 2009

(54) METHOD OF RECYCLING SOLID WASTE POLYSTYRENE PACKING MATERIALS

(76) Inventor: Zhi-Zhong Yuan, 8350 Sheffield Rd., San Gabriel, CA (US) 91775

( * ) Notice: Subject to any disclaimer, the term of this patent is extended or adjusted under 35 U.S.C. 154(b) by 547 days.

(21) Appl. No.: 11/227,834

(22) Filed: Jan. 17, 2006

(65) Prior Publication Data

US 2007/0249741 A1    Oct. 25, 2007

(51) Int. Cl.
*C08J 11/04* (2006.01)
(52) U.S. Cl. ........................................ 521/40.5; 521/47

(58) Field of Classification Search ................ 521/40.5, 521/47
See application file for complete search history.

(56) References Cited

U.S. PATENT DOCUMENTS 4,031,039 A * 6/1977 Mizumoto et al. ......... 521/46.5

* cited by examiner

*Primary Examiner*—Edward J Cain
(74) *Attorney, Agent, or Firm*—Thomas I. Rozsa

(57) ABSTRACT

A method of treating and recycling solid waste polystyrene packing material by dissolving the solid waste polystyrene packing material in a dimethylbenzene based solvent to obtain a homogenous and viscous fluid which may be used as an adhesive material or a coating material.

20 Claims, No Drawings

METHOD OF RECYCLING SOLID WASTE POLYSTYRENE PACKING MATERIALS

BACKGROUND OF THE INVENTION

1. Field of the Invention

The present invention relates generally to the field of treatment and recycling of waste industrial and consumer materials, and more particularly relates to treatment and recycling of solid waste polystyrene packing materials.

2. Description of the Prior Art

Industrial and consumer waste materials have become a serious and major problem of environmental concern. One of the most notable solid waste material is polystyrene packing materials. Because of the advance and development of high polymer chemistry technologies, many high polymer resins have been widely used to make packing materials for both industrial and consumer product applications. However, most of the materials made from high polymer resins are non-degradable and ultimately form the so-called "white contamination" after their disposal which endangers the environment.

Many research and development efforts have carried on which focus on solving the "white contamination" problem. For example, one of the approaches is to "re-prill" the solid waste polythene or polypropylene packing and wrapping materials to produce reusable packing materials. Another example of such approaches is to use pyrolytic cracking techniques to produce gasoline and diesel from solid waste high polymer resin packing materials.

However, while the existing approaches in solving the "white contamination" problems have some beneficial effects, there are certain drawbacks. For example, the products produced by using regeneration technologies such as "re-prilling" are usually inferior to the original and non-regenerated materials in luster, strength and color. The gasoline and diesel products produced from pyrolytic cracking often do not meet the international quality standard. Moreover, during the course of manufacture, the free carbon generated in the process often cause jamming of the equipment.

Therefore, it is always desirable to provide a new method for recycling waste polymer resin packing materials, particularly the solid polystyrene packing materials, while overcome the problems existed in conventional recycling technologies.

SUMMARY OF THE INVENTION

The present invention is directed to a process of turning solid waste polystyrene packing material into a viscous fluid which can be used as an adhesive or coating material.

The present invention uses dimethylbenzene based solution as the solvent, and solid waste polystyrene packing material as the solute. Solid polystyrene material is widely used as a packing and wrapping material for both industrial and consumer products. Used polystyrene packing material often becomes solid waste that presents a major problem in waste management because of its size and non-biodegradable character.

The basic process of the present invention method involves the following steps. First, the xylene-dimethylbenzene solvent is poured into a reaction vessel made of glass, stainless steel, or ceramic material (but not plastic material). Then the solid waste polystyrene pieces are broken into small pieces and added into the solvent. The solid polystyrene pieces will dissolve in the solvent, and continued stirring will help to speed the dissolving process.

As more polystyrene pieces are dissolved into the solvent, the resultant product become more and more viscous, and the volume of the resultant product increases. The resultant viscous fluid may be filtrated to remove impurities. The final product then may be stored in a storage container made of glass, stainless steel, or ceramic material (but not plastic material).

The viscousness and fluidity of the final product can be controlled by the amount of solid polystyrene pieces added to and dissolved by the solvent. Generally, less solid polystyrene pieces added to and dissolved by the solvent means more fluidity and less viscousness, and vice-versa, more solid polystyrene pieces added to and dissolved by the solvent means less fluidity and more viscousness.

The final product is a viscous fluid material which may be used as an adhesive material or a coating material.

If the final product is to be used as a coating material, then the resultant fluid is preferred to be viscous but still maintain its fluidity, so that it can be easily applied to and spread over the surface to be coated. As a rough indicator, if the final product is to be used as a coating material, then the ratio between the volume of the final product and the initial volume of the solvent should be approximately 1.5:1.

As a coating material, the final products can be applied onto surfaces of various subjects made of many different materials such as paper, metal, wood, glass, ceramic, brick, marble, stone, concrete, etc. After being applied, the coating should be allowed to dry. Once dried, the coating is water-resistant and flame-resistant. If colored coating is preferred, color dyes may be added during the process of preparing the viscous fluid.

When used as an adhesive material, the resultant solution is preferred to be more thick and viscous which means that more solid polystyrene pieces need to be added into and dissolved by the solvent. As a rough indicator, if the final product is to be used as an adhesive material, then the ratio between the volume of the final product and the initial volume of the solvent is approximately 2:1.

As an adhesive material, the final product can be used to adhere various objects made of many different materials such as metal, wood, glass, ceramic, brick, marble, stone, concrete, etc. Once dried, the bonding is very strong and can withstand high forces.

Further novel features and other objects of the present invention will become apparent from the following detailed description, discussion and the appended claims.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Polystyrene is high polymer chemical polymerized from monomer styrene. The molecular structure of poly styrene is as follows:

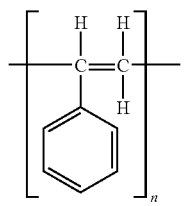

The molecular structure of styrene is an ethane molecule with a hydrogen replaced by a phenyl. There are all together four double bonds in it with three of them in a phenyl, forming a rather stable phenyl structure. Another double bond exists in the ethane, whose instability makes the ethane very active.

The polymerization of polystyrene is based on the active double bond in the ethane. In certain conditions, the active double bond will break to link with other active bond (active molecule) to form a new chemical compound.

For example, it may link with the active double bond of another styrene molecule which is the basis for the process of polymerization of congeneric molecules.

The number "n" in the structure formula refers to the number of styrene molecules polymerized in the polystyrene. The larger the "n" is, the larger the polymer is, and hence the higher the molecular weight is. The "n" has no definite value and varies with different polymerization conditions.

Polystyrene is a white powder, with thermal plasticity like other resins. It can be made into a solid packing material which has certain desirable properties, such as corrosion resistance, water resistance and good insulating property. However, after being used, the solid polystyrene packing and wrapping material become a waste material.

The present invention is a method and process of treating and recycling solid waste polystyrene packing material by reprocessing it through solubilization. First, a solvent is chosen with the consideration of easiness for extraction, low cost, good solubilization, and low toxicity.

In a preferred embodiment of the present invention, the mixture of two isomers: 1,3-dimethylbenzene and 1,4-dimethylbenzene, is chosen as the solvent. This is because dimethylbenzene and polystyrene all belong to aromatic chemicals, and all use benzene atomic group as their bases. Their similar structures make it easier for them to interact with and insert into each other. In fact, through many experiments, the Applicants have discovered and observed that it is rather fast for polystyrene to dissolve in 1,3-dimethylbenzene and 1,4-dimethylbenzene, and no phenomena of swelling was found. The solution is also homogenous.

In addition, dimethylbenzene is easy to volatilize and has low toxicity. As a result, dimethylbenzene will volatilize in a short time as polystyrene is solidifying. There is no long-term effect left.

The dimethylbenzene solvent used in the present invention may be obtained from two sources. The first source is from the product of dry distillation from coal. Solvent naphtha is used to extract and absorb the product when the coal gas is just cooled, which can separate the aromatic chemicals from the coal gas. This results in crude benzene. The crude benzene is then rectified to achieve the distillation fraction in certain range of temperature. In order to reduce the content of impurity of the solvent, the temperature range should be maintained between 138-140° C. The dimethylbenzene solvent is obtained after condensation.

The other source for obtaining dimethylbenzene is the aromatic production produced by catalytic reforming from petroleum. The dimethylbenzene solvent is obtained from rectifying the distillation fraction in the same temperature mentioned above and after condensation.

Alternatively, commercially available xylene-dimethylbenzene solution ($C_6H_4(CH_3)_2$), which is a petroleum product, may be used as the solvent. Commercial xylene-dimethylbenzene solution typically contains approximately 10-20% of ethylbenzene, 15-25% of o-xylene, 40-50% of m-xylene, and 20-30% of p-xylene. In the experiments of the present invention described below, commercially available xylene-dimethylbenzene solution is used as the solvent.

As one of the preferred embodiments, the present invention method includes the following steps:

1. Preparing the solvent: the dimethylbenzene based solvent is poured into a reaction vessel made of glass, stainless steel, or ceramic material (but not plastic material) which can not be dissolved by the solvent;
2. Preparing the solute: the solid waste polystyrene pieces are broken into small pieces so that they are easy to fit into the reaction vessel and be dissolved;
3. Adding the solute into the solvent to dissolve the solid polystyrene pieces in the solvent (continued stirring will help to speed the dissolving process); and
4. Filtering the resultant viscous fluid to remove impurities, if necessary.

As more polystyrene pieces are dissolved into the solvent, the resultant product become more and more viscous, and the volume of the resultant product increases. The final product then may be stored in a storage container made of glass, stainless steel, or ceramic material (but not plastic material) or other materials that are not dissolvable by the solvent.

The viscousness and fluidity of the final product may be controlled by the amount of solid polystyrene pieces added to and dissolved by the solvent. Generally, less solid polystyrene pieces added to and dissolved by the solvent means more fluidity and less viscousness, and vice-versa, more solid polystyrene pieces added to and dissolved by the solvent means less fluidity and more viscousness. The final product is a homogenous and viscous fluid which may be used as an adhesive material or a coating material.

EXAMPLE ONE

Recycling Solid Waste Polystyrene to Product a Coating Material

Using xylene-dimethylbenzene as solvent and solid waste polystyrene pieces as solute, the above steps are performed, until the ratio of the volume of the final product and the initial volume of the solvent is approximately 1.5:1. The final product is yellowish in color, homogenous and viscous but still maintain its fluidity. It can be used as a coating material by applying it to and spreading it over the surface of various subjects made of many different materials such as paper, metal, wood, glass, ceramic, brick, marble, stone, concrete, etc. After being applied, the coating should be allowed to dry. Once dried, the coating is water-resistant and flame-resistant. If colored coating is preferred, color dyes may be added during the process of preparing the viscous fluid.

EXAMPLE TWO

Recycling Solid Waste Polystyrene to Product an Adhesive Material

Using xylene-dimethylbenzene as solvent and solid waste polystyrene pieces as solute, the above steps are performed, until the ratio of the volume of the final product and the initial volume of the solvent is approximately 2:1. The final product is yellowish in color, homogenous and very thick and dense. It can be used as an adhesive material to bond various objects made of many different materials such as metal, wood, glass, ceramic, brick, marble, stone, concrete, etc. Once dried, the bonding is very strong and can withstand high forces.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method of treating and recycling solid waste polystyrene packing material, comprising steps of preparing a dimethylbenzene based solvent, adding and dissolving said solid waste polystyrene packing material in said solvent to obtain a homogenous and viscous fluid and adding color dyes which combination is used as an adhesive material or a coating material.

2. The method as claimed in claim 1, wherein said step of preparing said solid waste polystyrene packing material comprises the step of breaking large solid waste polystyrene packing pieces into small solid waste polystyrene packing pieces.

3. The method as claimed in claim 1, further comprising the step of stirring while adding and dissolving said waste polystyrene packing material in said solvent.

4. The method as claimed in claim 1, further comprising the step of filtering said homogenous and viscous fluid to remove impurities.

5. The method as claimed in claim 1, further comprising the step of storing said homogenous and viscous fluid in a storage vessel made of one or more materials not dissolvable by said solvent.

6. The method as claimed in claim 1, wherein said dimethylbenzene based solvent is xylene-dimethylbenzene.

7. The method as claimed in claim 1, wherein a ratio of a volume of the final homogenous and viscous fluid and an initial volume of the solvent is approximately 1.5:1 for producing said homogenous and viscous fluid.

8. The method as claimed in claim 1, wherein a ratio of a volume of the final homogenous and viscous fluid and an initial volume of the solvent is approximately 2:1 for producing said homogenous and viscous fluid.

9. A method of treating and recycling solid waste polystyrene packing material, comprising the steps of preparing a dimethylbenzene based solvent, adding and dissolving said solid waste polystyrene packing material in said solvent to obtain a homogenous and viscous fluid which is used as an adhesive material or a coating material, wherein a ratio of a volume of the final homogenous and viscous fluid and an initial volume of the solvent is approximately 1.5:1.

10. The method as claimed in claim 9, further comprising the step of breaking large solid waste polystyrene packing pieces into small solid waste polystyrene packing pieces.

11. The method as claimed in claim 9, further comprising the step of stirring while adding and dissolving said waste polystyrene packing material in said solvent.

12. The method as claimed in claim 9, further comprising the step of filtering said homogenous and viscous fluid to remove impurities.

13. The method as claimed in claim 9, further comprising the step of adding color dyes to produce colored homogenous and viscous fluid material.

14. The method as claimed in claim 9, wherein said dimethylbenzene based solvent is xylene-dimethylbenzene.

15. A method of treating and recycling solid waste polystyrene packing material, comprising the steps of preparing a dimethylbenzene based solvent, adding and dissolving said solid waste polystyrene packing material in said solvent to obtain a homogenous and viscous fluid which is used as an adhesive material or a coating material, wherein a ratio of a volume of the final homogenous and viscous fluid and an initial volume of the solvent is approximately 1.5:1.

16. The method as claimed in claim 15, further comprising the step of breaking large solid waste polystyrene packing pieces into small solid waste polystyrene packing pieces.

17. The method as claimed in claim 15, further comprising the step of stirring while adding and dissolving said waste polystyrene packing material in said solvent.

18. The method as claimed in claim 15, further comprising the step of filtering said homogenous and viscous fluid to remove impurities.

19. The method as claimed in claim 15, further comprising the step of adding color dyes to produce colored homogenous and viscous fluid material.

20. The method as claimed in claim 15, wherein said dimethylbenzene based solvent is xylene-dimethylbenzene.

* * * * *